April 16, 1940. C. J. HOLSLAG 2,197,215
VOLTAGE REGULATING MEANS FOR ALTERNATING CURRENT ARC WELDING
Filed April 7, 1933
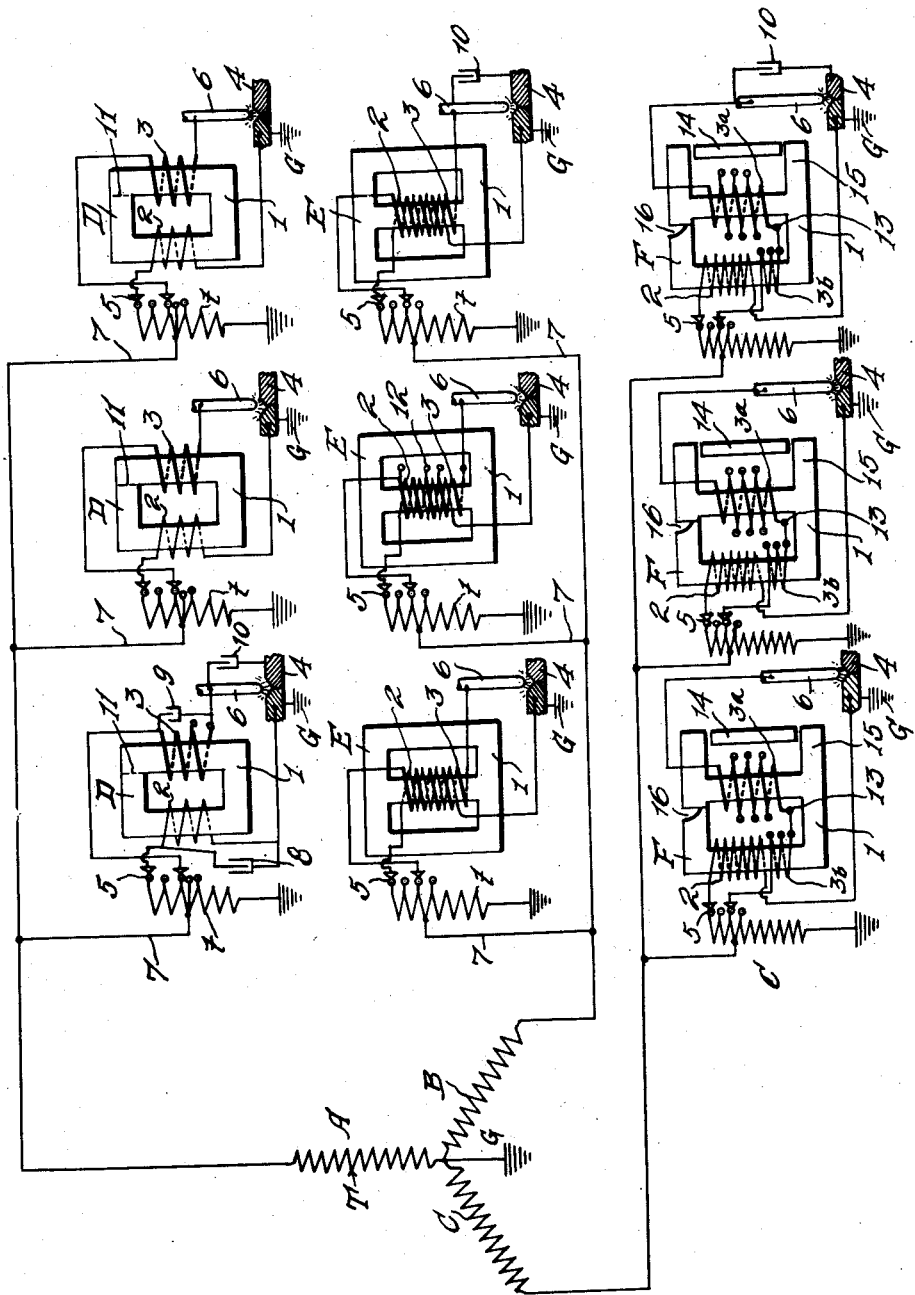
INVENTOR
Claude J. Holslag.
BY
A. D. T. Libby
ATTORNEY Patented Apr. 16, 1940

2,197,215

UNITED STATES PATENT OFFICE 2,197,215

VOLTAGE REGULATING MEANS FOR ALTERNATING CURRENT ARC WELDING

Claude J. Holslag, South Orange, N. J., assignor to Electric Arc Cutting & Welding Company, Newark, N. J.

Application April 7, 1938, Serial No. 200,608

8 Claims. (Cl. 219—8)

This invention relates to an alternating current arc welding system.

In practically all the early systems using an alternating current transformer for the source of current supply for the arc, the open circuit voltage was, in comparison with present-day practice, rather high. For example, the standard now taken is 80, whereas in the early alternating current welding systems, the voltage was in the neighborhood of 125 or higher. This high voltage was objectionable in that the operator, in inserting electrodes in the electrode holder, could get a disturbing shock, depending on conditions surrounding the welding operation.

In my application, Serial No. 197,544, filed March 23, 1938, I have shown and described means for reducing this open circuit voltage.

My present application has for its object the provision of different means for lowering the open circuit voltage, while at the same time obtaining a highly efficient welding system.

Another object of my present invention is to provide an arc welding distribution system which is an improvement over that shown in my Patent 2,025,207, issued December 24, 1935.

My present invention is illustrated in the annexed drawing in which the main source of supply is illustrated as a three-phase, star-connected transformer T, in which the neutral is grounded at G. The three phases of the transformer are indicated as A, B and C.

To the phase A, I have shown connected a plurality of similar devices D in the form of small transformers, each of which includes a core 1 of suitable magnetic material having a winding 2 on one leg of the core and a winding 3 on a separate leg of the core, the windings 2 and 3 having a current-carrying capacity compatible with the welding requirements. The winding 2 has one end connected to the work 4 which may be grounded, while the other end of the winding 2 is connected to what may be termed the high side of an auto-transformer t having a plurality of taps 5. One end of the winding 3 is connected to the movable electrode 6, while the other end of the winding 3 is connected to one of the taps 5 on the auto-transformer t.

As indicated in the drawing, the ends of the windings 2 and 3, remote from the welding electrodes, may be connected to the auto-transformer t so as to pick up therefrom the same voltage; or these terminals of the windings 2 and 3 may be shifted on the transformer t so that either one of the windings picks up a higher or lower voltage than the other, and these voltages may be either higher or lower than the voltage applied to the auto-transformer t by its connection 7 to the source of current-supply, such as phase A of the supply transformer T.

With the arrangement using the devices D, the windings 2 and 3 are so connected that, on open circuit, the voltage generated in the winding 3 is in opposition to or subtracts from the voltage picked up by it from the auto-transformer t, but when the arc is started between the electrodes 6 and 4, the reaction between the windings produces a shifting of the magnetic flux so that the two windings 2 and 3 act as multiple reactances, one of which is in series with the arc.

In some cases a condenser 8 may be connected across the winding 2, and a condenser 9 across the winding 3, and a condenser 10 across the arc electrodes. The action of the condensers 8 and 9 is such as to reduce the wattless current and thereby increase the power factor and the efficiency of the apparatus, while the current through the condenser 10 across the electrodes is out of phase with the current through the arc and therefore helps to sustain the arc when the main welding current in the electrode circuit is passing through the zero portion of each cycle.

In some cases it may be desirable to insert a small air gap 11 in the core structure of the transformers D.

Connected to the phase B of the supply transformer T, I have illustrated a shell-type of transformer E in which the windings 2 and 3 are on the central leg of the core. Taps 12 may be brought out from either of the windings as desired. This type of device is especially adapted for large current in the arc circuit, whereas the small transformer D is especially adapted for any small currents required in the welding operation.

Connected to the phase C of the transformer T, I have shown a transformer F in which the winding 2 is arranged as in phase A, but the winding 3 is divided into two parts, 3a and 3b, both parts of the winding having taps 13 to get the necessary fine adjustment which is supplemented by a flux diverter 14 adjustably mounted between the projecting arms 15 of the core 1. In some cases, an air gap as shown at 16 may be utilized; also condensers may be arranged somewhat as shown in phase A, the condenser 10 being indicated across the electrodes 6 and 4.

By shifting the taps on the windings 3a and 3b and adjusting the flux diverter, the transformer F is adapted to give regulation for both light and heavy current welding. The action of at least the winding 3a is arranged to act the same as the winding 3 in the phases A and B; that is to say, this is connected so as to reduce the open circuit voltage before the arc is started, but to act as a reactor after the arc has been started.

While I have shown different types of transformers D, E and F connected to respective phases of a supply transformer T, it is to be understood that they may be used interchangeably on either phase, or any one form may be used on all of the phases.

It is also to be understood that any one of the small transformers D, E and F may be used in connection with any early type of alternating current arc welding transformer having an initial high open circuit voltage to bring this voltage to or below the standard rate of voltage which is now accepted in practice.

It is also to be understood that the small transformers, which may be termed control transformers, may be connected directly to the source of supply without the use of the auto-transformer t which may be termed a feed transformer, but where the welding leads from the supply transformer are of considerable length, it may be desirable to step up the voltage at the station before passing the current to the control transformer. This may be efficiently done by the use of the auto-transformer t as indicated in the drawing, although a double-wound transformer may be used.

In some cases where a building is laid out particularly for welding, and the structure is of steel, the work 4 is preferably grounded and the entire steel frame of the building may act as the ground return, it being understood that the supply transformer T has the neutral grounded to the steel frame of the building; or, where the frame of the building is not constructed of steel, one heavy lead may run from the neutral of the transformer T to the various welding stations, thereby acting as a common return for all of these stations.

Where very heavy current is required, a plurality of the small or control transformers may be connected in parallel.

In the transformer F I have shown a certain type of air gap 16 which may be used in the forms D and E. Thus, it is obvious that my invention is susceptible of certain changes without departing from the spirit thereof or the scope of the appended claims.

What I claim is:

1. In an alternating current arc welding system, a source of current supply, means for changing at a welding station the voltage of the current supply, said means including a feed transformer and a control transformer having a core and at least two windings on the core, one winding being connected to the feed transformer with one terminal connected to the work, the other winding having one terminal connected to the welding electrode, while the other terminal is connected to the feed transformer, the windings on the control transformer being so related that the voltage generated in the second-mentioned winding on open circuit subtracts from the voltage of the feed transformer, but when the arc is started both windings act as reactors, at least one of which is directly in the welding circuit.

2. An arc welding system as set forth in claim 1, further characterized in that said second-mentioned winding on the control transformer is split in two parts, one part being on a portion of the core with the first-mentioned winding, while the other part is on a separate portion of the core.

3. In an alternating current arc welding system, a source of current supply, means for changing at a welding station the voltage of the current supply, said means including a feed transformer and a control transformer, the latter having at least two windings in inductive relation to each other, one winding being connected to the feed transformer with one side connected to the work to be welded, while the other winding has one end connected to the movable electrode and the other end connected to the same side of the feed transformer as the non-grounded or non-work end of the first-mentioned winding, the windings being connected so the second winding subtracts its voltage from that of the source of current on open circuit.

4. In an alternating current arc welding system, a source of current supply having a voltage higher than the open circuit voltage now accepted as standard, means for changing at a welding station the voltage of the current supply, said means including two windings in inductive relation to each other, one winding being bridged across the source of current, one side being connected to the work to be welded, while the other winding has one end directly connected to the movable electrode and the other end directly connected to the same side of the source of current as the non-grounded or non-work end of the first-mentioned winding, the windings being connected so the second winding subtracts its voltage from that of the source of current on open circuit, but when the arc is started both windings automatically act as reactors, at least one of which is in series with the source of current and the arc.

5. An alternating current arc welding system in which there is included a plurality of welding stations and a main source of current materially higher than the voltage required at a station arc, means for obtaining a low open circuit voltage at each welding station, said means including a core of magnetic material with at least two windings thereon, one winding being connected across the source of current with a connection on one side of the work to be welded, the other winding being connected between the movable electrode and the high side of the source of current, the winding being connected so the voltage generated in the second-mentioned winding on open circuit subtracts from the voltage of the source of supply, but when the arc is started, both windings act as reactors, at least one of which is directly in the welding circuit, said system being further defined in that the said windings are connected to the source of current supply through an auto-transformer, whereby the voltage applied to each winding can be made the same and the same as the voltage of the source of supply, or one can be made higher or lower than the other, and higher or lower than the voltage of the source of supply.

6. In an alternating current arc welding system, a main source of welding current having a no-load voltage materially higher than the present-day standard, means for reducing this voltage at a welding station to a desired value, means for further reducing the last-mentioned voltage, said last-mentioned means including a small transformer having a core and windings with a current capacity equal to the arc requirements, one winding being connected to said first-mentioned means, while another winding is connected in series with said first mentioned means and the movable electrode in the arc circuit, the last-mentioned winding subtracting its voltage from the voltage of the said first-mentioned means on open circuit, but when the arc is started it at least acts as a reactor.

7. In an alternating current arc welding system as set forth in claim 6, further defined in that said first-mentioned means is an auto-transformer connected to the main source of current, and the small transformer windings are supplied with current derived from the auto-transformer.

8. An alternating current arc welding system comprising, a main supply polyphase transformer having an open circuit voltage on each phase materially higher than the voltage required at the arc, and preferably higher than the present-day standard open circuit voltage for welding machines, a plurality of welding stations for each phase, each station including an auto-transformer connected across the phase supplying the station and a small transformer having at least two windings, one an exciting winding connected between the auto-transformer and one side of the phase-supply circuit, and another winding connected to the auto-transformer and to the electrodes, said windings being connected so the second-mentioned winding on open circuit subtracts its voltage from that of the supply, but during welding acts as a reactor.

CLAUDE J. HOLSLAG